T. BUSWELL.
Fastener for Harness Saddle-Pads.
No. 213,870.          Patented April 1, 1879.
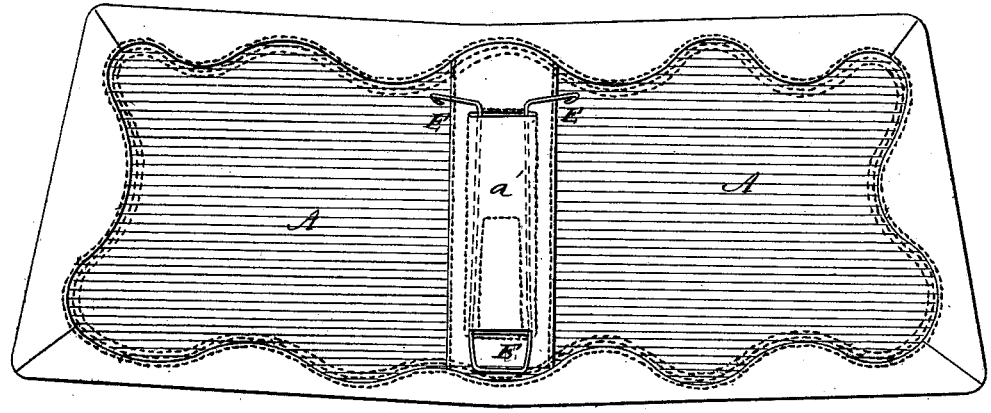
Fig. 1
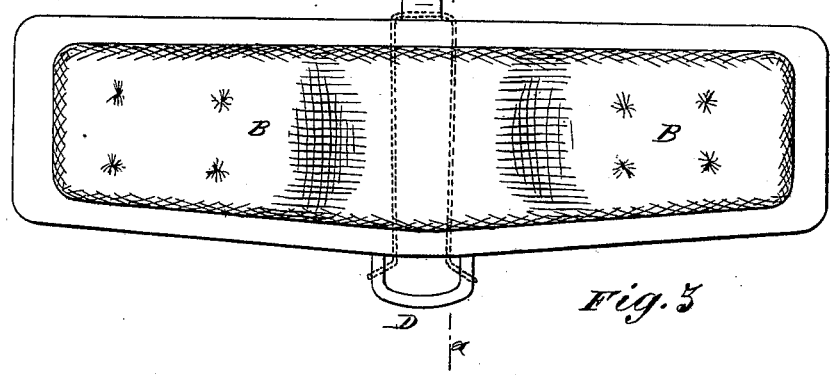
Fig. 2
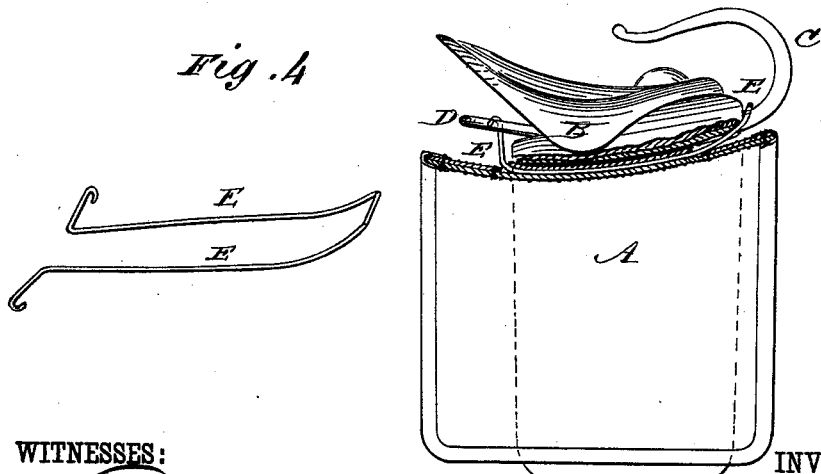
Fig. 3
Fig. 4
WITNESSES:
C. Neveux
C. Sedgwick
INVENTOR:
T. Buswell
BY Munn & Co.
ATTORNEYS.

UNITED STATES PATENT OFFICE.

TURNER BUSWELL, OF SOLON, MAINE.

IMPROVEMENT IN FASTENERS FOR HARNESS-SADDLE PADS.

Specification forming part of Letters Patent No. 213,870, dated April 1, 1879; application filed September 6, 1878.

*To all whom it may concern:*

Be it known that I, TURNER BUSWELL, of Solon, in the county of Somerset and State of Maine, have invented a new and useful Improvement in Fasteners for Harness and Saddle Pads, of which the following is a specification:

Figure 1 is a top view of a pad having my improved fastener attached to it, ready to be applied to a saddle. Fig. 2 is an under-side view of a saddle, showing in dotted lines the position of the fastener when applied. Fig. 3 is a section of a saddle and pad connected by the fastener, taken through the line $x\,x\,x$, Figs. 1 and 2. Fig. 4 is a detail perspective view of the fastener.

Similar letters of reference indicate corresponding parts.

The object of this invention is to furnish an improved fastener for securing an extra pad or housing to a harness-saddle and other saddles, which shall be so constructed as to hold the pad securely in place, and prevent it from sliding, drawing, and twisting, and which at the same time shall be simple in construction, convenient in use, and will not hurt the horse's back or disfigure the saddle.

The invention consists in the wire fastener, bent into U shape, and having the end parts of its arms bent outward and upward, and provided with hooks upon their ends, to adapt it for use for securing a pad to the water-hook and the crupper-loop of a saddle; in a pad having a strip of leather stitched across its center, to adapt it to receive the fastener; and in the combination of the fastener and the leather strip with a pad for securing it to the water-hook and the back-strap staple of a saddle, as hereinafter fully described.

A represents the pad; B, the saddle; C, the water-hook, and D the crupper-loop. E represents the fastener, which is made of wire bent into U shape. The bend or loop of the fastener is bent upward, to adapt it to be passed over the water-hook C. The end parts of the arms of the fastener are bent upward and outward, and have hooks formed upon their ends to hook over the arms of the crupper-loop, as shown in Fig. 3, and in dotted lines in Fig. 2.

Across the center of the upper side of the pad A is stitched a strip of leather, $a'$, between which and the said pad the fastener E is passed, the bend or loop and the hook ends of the said fastener projecting through cross-slits in the said strip $a'$, near its ends, as shown in Fig. 1. The strip of leather $a'$ is also stitched between the arms of the fastener, to prevent the said fastener from slipping out when detached from the saddle.

Having thus described my invention, what I claim as new, and desire to secure by Letters Patent, is—

1. The wire fastener E, bent into U shape, and having the end parts of its arms bent outward and upward, and provided with hooks upon their ends to adapt it for use for securing a pad to the water-hook and the crupper-loop of a saddle, substantially as herein shown and described.

2. A pad, A, having a strip of leather, $a'$, stitched across its center to form pockets, and thus adapt it to receive the fastener E, substantially as herein shown and described.

3. The combination of the fastener E and the leather strip $a'$ with a pad, A, for securing it to the water-hook and the crupper-loop of a saddle, substantially as herein shown and described.

TURNER BUSWELL.

Witnesses:
D. R. McINTIRE,
BYRON McINTIRE.